United States Patent Office 3,154,801
Patented Nov. 3, 1964

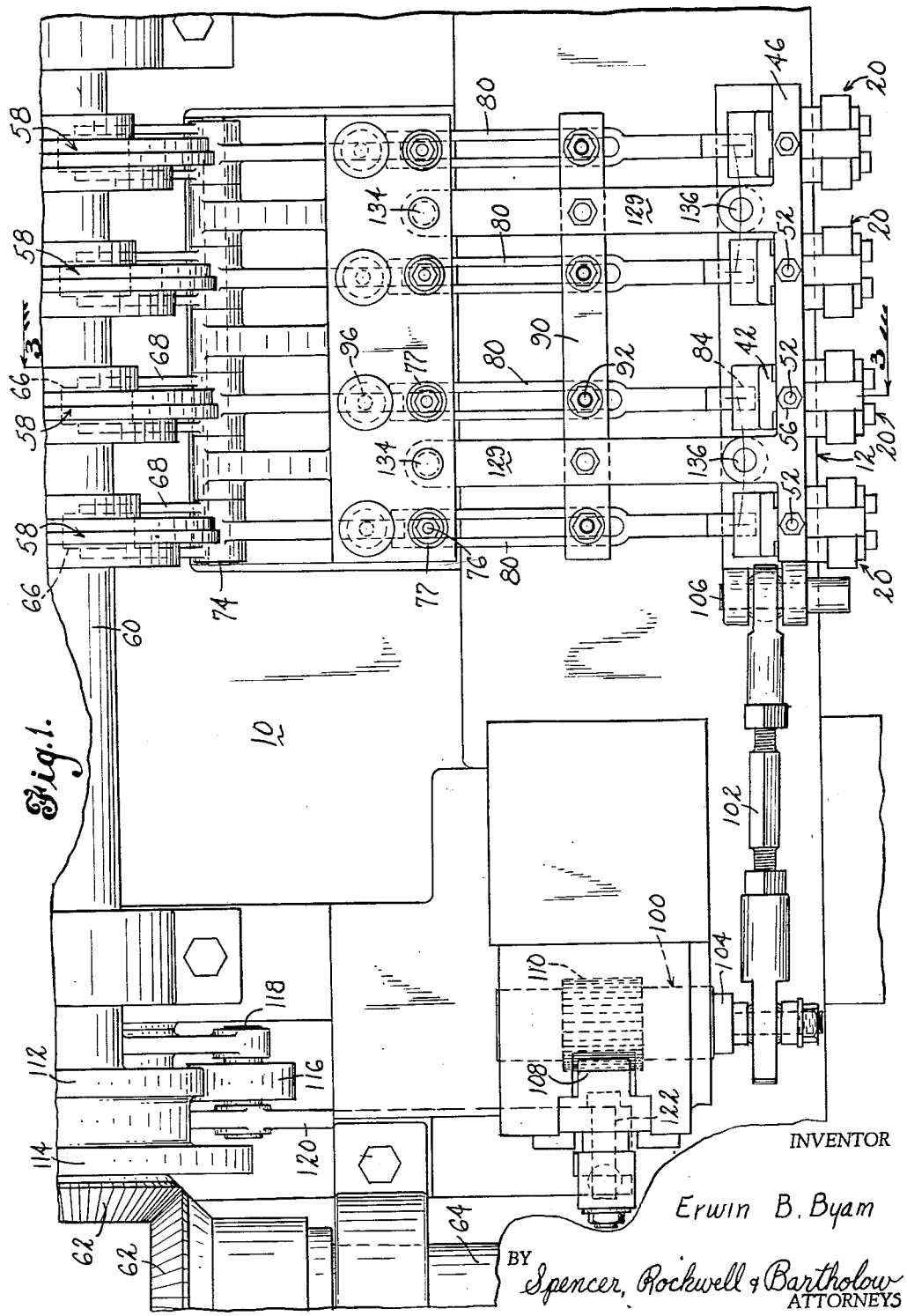

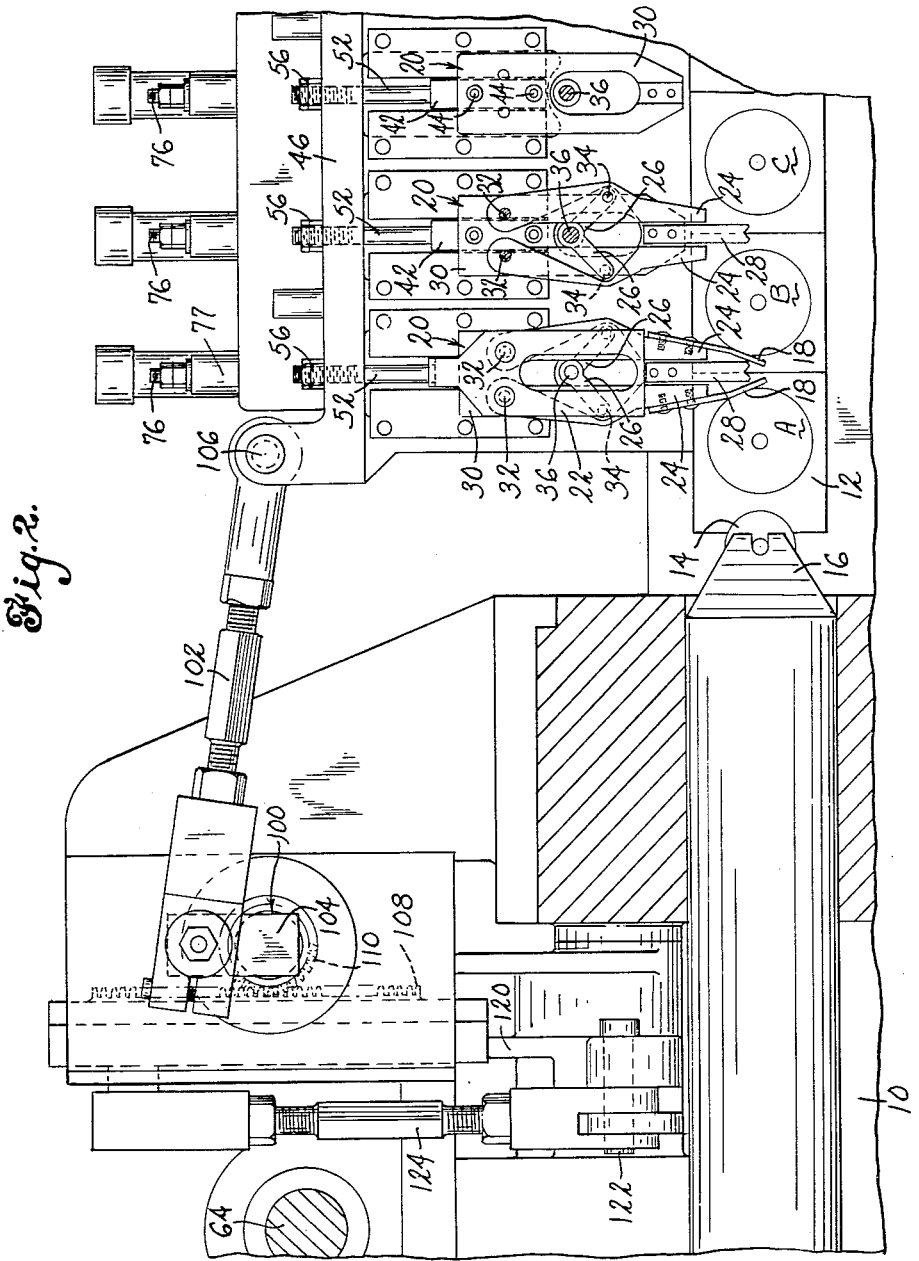

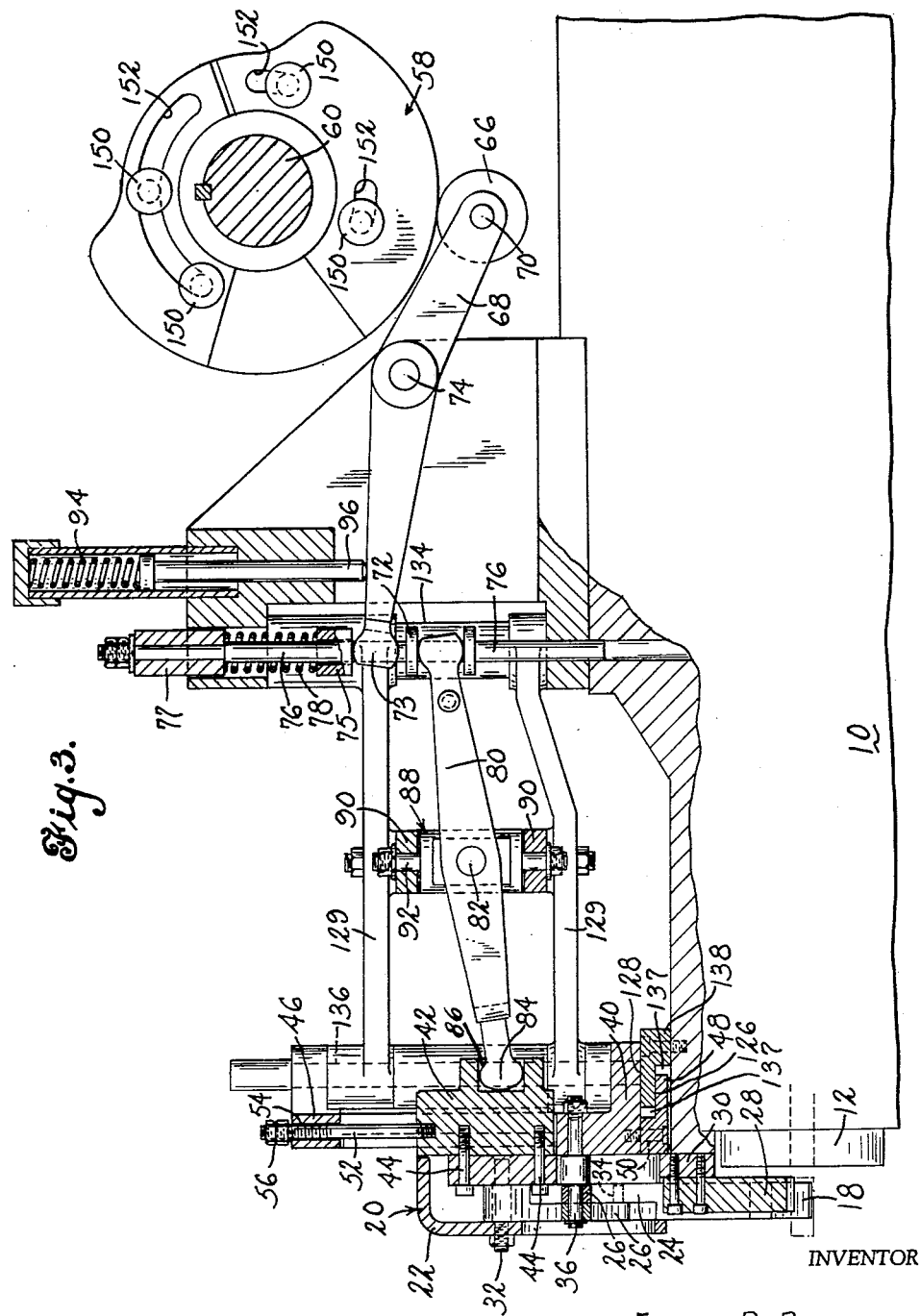

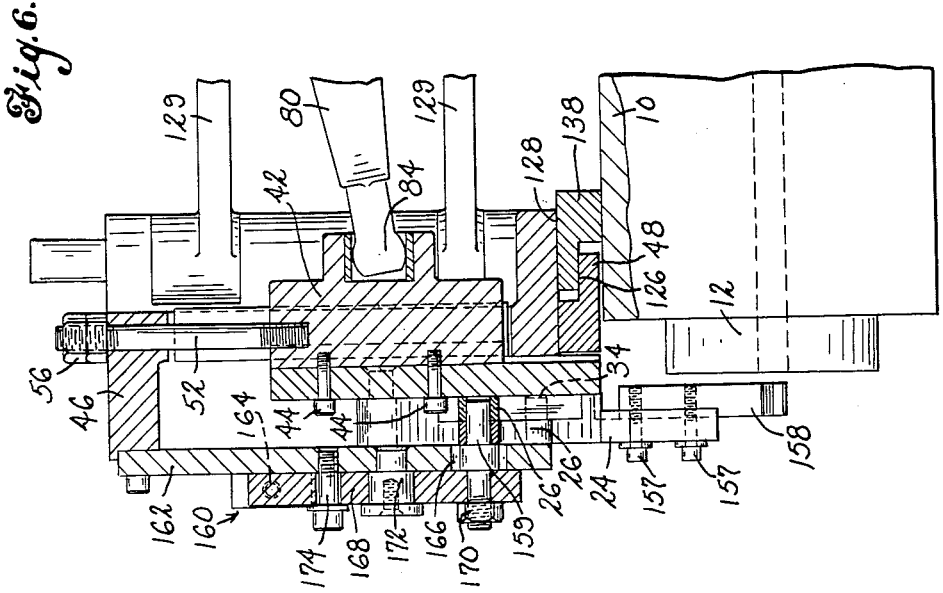
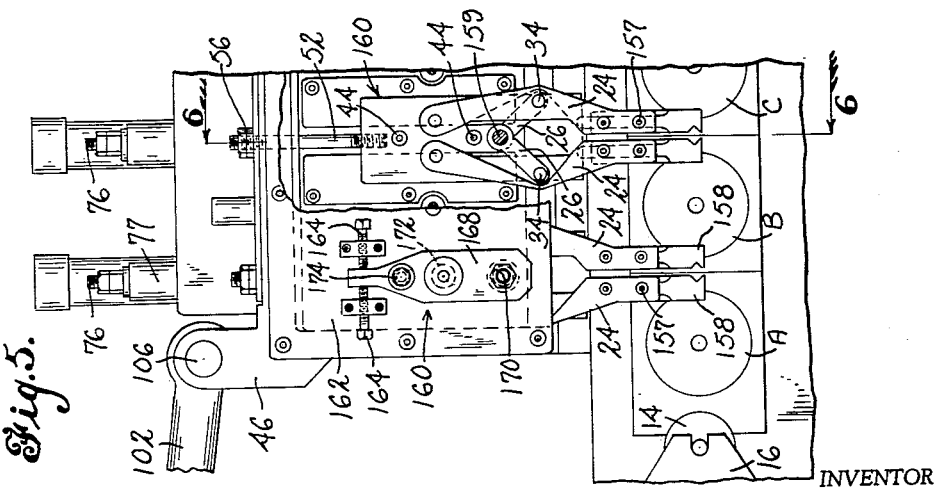

3,154,801
TRANSFER MECHANISM WITH MEANS TO OPERATE FINGERS INDEPENDENTLY OF MOVEMENT OF TRANSFER HEAD
Erwin B. Byam, Wolcott, Conn., assignor to Textron Inc., Providence, R. I.
Filed Mar. 7, 1962, Ser. No. 178,148
7 Claims. (Cl. 10—12)

This invention relates to metalworking machines, such as progressive headers, nut formers or the like, and more particularly to a transfer mechanism for such devices.

In machines of this character, where a blank is operated on progressively at a number of stations in the same machine, means are provided for transferring the blank from one station to the next. This function is usually performed by so-called transfer fingers, these fingers being arranged to receive and grip a blank when it is pushed out of one die and are then moved to position opposite the next succeeding die or work station where the blank will be pushed out of the transfer fingers to be operated upon at the station to which it has been transferred. The present invention relates to the construction and operation of the transfer mechanism, and more particularly to the control of the gripping fingers in their paths and movements to grip, transfer and release the blanks at the proper time.

In transfer mechanisms heretofore used on headers or metalworking machines, it was extremely difficult for the mechanism to handle both long and short irregular shaped blanks. The linkages of the transfer mechanism were complex and resulted in abrupt, jerky motions of the fingers in transferring the blank from one station to another along a complicated path. Consequently, the transfer fingers traveled greater distances than were necessary thereby acutely limiting the time allowable for gripping and releasing the blanks, and also detracting from the versatility of the transfer mechanism.

In view of the foregoing, an object of the invention is to provide a transfer mechanism which has a simple linkage system that operatively guides the transfer fingers in a substantially straight line from center to center of the dies when transferring a blank from one die to the next.

Another object of the invention is to provide a transfer mechanism in which the transfer fingers operate smoothly throughout the path of travel.

Still another object of the invention is to provide a transfer mechanism which by virtue of utilizing a parallelogram linkage system will have versatility in controlling its paths of motion.

Other objects of the invention will in part be obvious and will in part appear hereinafter.

The invention accordingly comprises the features of construction, combination of elements, and arrangement of parts which will be exemplified in the construction set forth in the following detailed disclosure, and the scope of the invention will be indicated by the claims.

For a fuller understanding of the nature and objects of the invention, reference should be had to the following detailed description taken in connection with the accompanying drawings, in which:

FIG. 1 is a plan view of the transfer mechanism according to a preferred embodiment of the invention;

FIG. 2 is a front elevational view of the die block of a progressive header or like machine showing the transfer mechanism applied thereto;

FIG. 3 is a sectional view taken along line 3—3 of FIG. 1;

FIG. 4 is a schematic diagram showing the paths of motion of the transfer fingers;

FIG. 5 is a partial front elevational view of the die block with another form of transfer fingers;

FIG. 6 is a sectional view taken along line 6—6 of FIG. 5.

Referring now to the drawings, there is shown in FIGS. 1 and 2, which illustrate a preferred embodiment of the invention, a progressive head or like machine comprising a frame or bed 10, having a die bed 12 at the forward portion thereof. The die bed 12 is provided with a cutoff station 14 where a length of rod or wire stock is severed in the usual manner to form the workpiece or blank upon which the machine operates. Adjacent the cutoff station 14, a cutoff knife 16 is provided which carries the blank to the first die and which returns after a punch has partially inserted the blank into the die.

As illustrated, the machine is provided with four pairs of gripping fingers which would be associated with five dies in the machine. While FIG. 2 shows only three dies and is then broken away, it is understood that there would be two more dies in the machine illustrated since one pair of gripper fingers operates between a pair of die stations to deliver the blank from one die to the following one. For example, the gripper fingers located between dies A and B would deliver a blank from die A to die B, and the gripper fingers located between dies B and C would deliver the blank from die B to die C. The blanks would therefore be moved from one die station to the next progressively from the cutoff station 14 in a step-by-step movement to stations A, B, C, etc., depending upon the number of stations in the particular machine employed.

As shown in FIGS. 2 and 3, a mechanism is provided for lifting and lowering gripper fingers 18 and causing these fingers to grip and release the blanks carried therewith. In FIG. 2, transfer finger assembly 20 is shown in various stages of construction. The transfer finger assembly 20 shown between dies A and B is fully assembled, that shown between dies B and C has cover 22, and the gripper fingers 18 removed, and that shown to the right of die C has the cover 22, the gripper fingers 18, transfer arms 24, links 26, and centerpiece holder 28 removed.

The transfer arms 24 are pivotally connected to a transfer plate 30, at pivot points 32. The links 26 pivotally connect the lower portions of the transfer arms 24 at pins 34 to a common fixed pivot 36. The gripper fingers 18 are opened when the whole transfer finger assembly 20 is actuated to move in an upward direction thereby causing links 26 to move apart since pin 36 is stationary and mounted in a bracket 40 (FIG. 3). The gripper fingers 18 are closed when the entire transfer finger assembly 20 is moved in a downward direction. The remainder of the transfer finger assembly 20 is mounted to a lift plate 42 by means of bolts 44, while bracket 40 is longitudinally restrained and separately mounted. Both the lift plate 42 and bracket 40 are mounted in the transfer head 46. The bracket 40 is fixed to a transfer head slide 48 by means of bolt 50, while the lift plate 42 is slidably mounted to the transfer head 46. Rod 52 is threaded to lift plate 42, passes through aperture 54 and then engages nuts 56, with the bottom side of nuts 56 abutting the shoulder portion of the aperture in transfer head 46. Each transfer finger assembly is separately actuated by its own lift plate to cause the gripper fingers to open and close.

The actuating mechanism for one of the lift plates is shown in FIGS. 2 and 3 and includes one of a series of cams 58 mounted on a front shaft 60 so that the movement of this cam initiates the movement of the corresponding lift plate. The front shaft 60 is driven through a pair of bevel gears 62 by a side shaft 64 which is attached to the machine drive (not shown). A cam roller 66 follows cam 58, and is rotatably mounted to link 68 by pin 70. The motion of cam roller 66 is transmitted by a link 68 to a spool 72. Link 68 is pivoted at 74 and its cylindrical end 73 engages spool 72 on a spool shaft 76. A compression spring 78 is positioned about spool shaft 76 having a lower sleeve 75 and an upper sleeve 77. A downward movement of cam roller 66 will cause spool shaft 76 to move upwardly. This, in turn, will cause a link 80 pivoted about a pin 82 to rotate counterclockwise as viewed in FIG. 3. The left hand portion of link 80 is provided with a ball 84 which engages a socket 86 in the lift plate 42 so that the counterclockwise movement of link 80 will urge the lift plate 42 in a downward direction. Pivot pin 82 is affixed to a housing 88 which is pivotally mounted to plates 90 by means of studs 92. A spring 94 in a suitable housing urges a pin 96 against link 68 which in turn urges the cam roller 66 against cam 58. Compression spring 78 determines the tension in the grip fingers 18 since once the blank has been gripped by the gripper fingers 18, the lift plate 42 cannot continue downwardly due to the "jamming" action of the blank. This causes link 68 to move up against sleeve 75 and compress spring 78. The compression of spring 78 applies additional tension to the gripper fingers 18 to hold the blank until the cycle is reversed and the lift plates are moved in an upward direction. The distance between the fingers 18 is set by adjusting nuts 56 on rod 52 thereby limiting the downward position of the lift plate 42.

The transfer head 46 reciprocates laterally by the action of a crank 100 connected to an adjustable link 102 by crank arm 104. The adjustable link 102 is pivotally attached to the transfer head 46 by pivot pin 106. The crank 100 is oscillatably driven by rack 108 and pinion 110. Rack 108 is driven from front shaft 60 by a series of links and cams. Cams 112 and 114 engage two rolls 116 (only one roll 116 is shown) which are mounted on cam roll pin 118 upon which is also mounted an arm 120. The arm 120 is connected at its other end by pin 122 to adjustable link 124, and the adjustable link 124 is connected to rack 108. Therefore the motion of cams 112 and 114 is transmitted to arm 120 which is, in turn transmitted to adjustable link 124 which drives rack 108. Cams 112 and 114 are designed so that one drives arm 120 in a downward direction and the other drives it in an upward direction thereby imparting reciprocal motion to rack 108. The transfer head 46 is free to slide on surfaces 126 and 128 and it is also pivotally supported horizontally by bars 129 about axes 134 and 136. The lateral reciprocal motion of transfer head 46 is substantially in a straight line, however, since the support bars 92 pivot about an axis 134 which is parallel to the spool shaft 76, the lateral motion of the transfer head 46 follows a slightly arcuate path. Clearance 137 between lift frame slide 48 and stationary guide 138 allows for this slight arcuate movement of transfer head 46. Due to this construction, the top projection of bars 129 and links 80 forms a parallelogram, and bars 129 and links 80 are always parallel to one another during the operation of the transfer mechanism.

Referring now to FIGURE 4, the operation of the transfer mechanism is as follows: the transfer head 46 is at the extreme left of its travel as viewed in FIG. 2, and the lift frame 42 is in a downward position as viewed in FIG. 2, so that the gripper fingers 18 and centerpiece holder 28 embrace a blank that has been ejected from a die (X). Cam 112, which is driven by front shaft 60 in timed relationship with the actuation of heading punches or the like, then actuates arm 120 and thereby rack 108 in an upward direction causing crank 100 to rotate clockwise (FIG. 2) and to impart lateral movement to transfer head 46 toward the right through link 102. The cam 112 is so designed that the motion of transfer head 46 will continue until the transfer finger assembly 20 is aligned with the center of die (Y). At this time, cam 58 begins to raise the transfer finger assembly 20 and the gripper fingers 18 release the blank so that it may be inserted by a punch, not shown, in the die Y. As the blank is being inserted in the die Y, the transfer finger assembly continues to rise and cam 114 actuates arm 120 in a downward direction to cause the transfer head 46 to move toward the left. The combination of the raising of the transfer finger assembly 20 and the motion of the transfer head 46 toward the left results in an arcuate return path for the gripper fingers 18. When the transfer head 46 reaches the midpoint of its return path, the transfer finger assembly 20 begins to move downward by action of cam 58. This motion continues until the gripper fingers are returned to their initial position to receive a blank from die X. The resultant return path just described is an arcuate one; however, one can vary its path by the timing and design of cams 58, 112 and 114. It can follow a path of return from die $y^1$ to die $x^1$ as indicated by virtue of having cam 114 dwell while the transfer finger assembly is raised; then having cam 58 dwell while cam 114 actuates the linkage system to move transfer head to the left and then cams 114 and 112 dwell while cam 58 lowers the transfer finger assembly 20 into alignment with die center $x^1$. Either of the two paths just described, or any intermediate path, as one indicated from die $y^{11}$ to $x^{11}$, may be followed according to the design and timing of cams 58, 112 and 114. In any event, the reciprocation of the transfer head and the movement of the left plates are in timed relation to the movement of the punches mounted on the gate (not shown), so that the transfer finger assembly will not be in the vicinity of the die aperture while the punches are contacting the work.

Although the operation of only one transfer finger assembly has been discussed, the other transfer finger assemblies operate in the same manner between their two assigned die stations. It should be noted that, by separately designing and positioning each individual cam 58 for each transfer finger assembly, the closing or opening of the gripper fingers and return path of each transfer finger assembly can be set independently of one another. An adjustable feature to achieve this independent action is shown in FIG. 3 where, by loosening bolts 150, the timing of cam 58 can be altered by rotating cam 58 in slots 152 and after this adjustment retightening bolts 150.

Although the transfer finger assembly 20 is ideal for blanks of uniform cross section, some difficulty may be encountered in handling blanks which have different cross-sectional shapes along their length. To overcome this shortcoming, an alternate transfer finger assembly 160 is shown in FIGURES 5 and 6. The centerpiece holder 28 has been completely removed and an adjustable feature has been added. The gripper fingers 158 have a different shape and are attached to transfer arms 24 by screws 157, while the links 26 are similarly attached to the transfer arms 24 by pins 34. The common fixed pivot 159 is mounted in an oversized hole 166 in cover 162 and fastened to plate 168 by nut 170. The operation of the lift plate 42 is the same as before with the attendant linkage system and the gripper fingers 158 similarly opened and closed when the lift plate 42 is raised and lowered respectively. The gripper fingers 158 can be adjusted laterally for any misalignment with the die centers. This is accomplished by the adjustment of screws 164 which bear against plate 168. Plate 168 is pivotally mounted to cover 162 by pin 172 and fastened by cap screw 174 which passes through an oversized hole in plate 168. Therefore the movement of screws 164 will cause plate 168 to pivot about pin 172 to cause arcuate movement of pin 159 in oversized hole 166. The arcuate movement of pin 159 will similarly swing the transfer arm 24 and gripper fingers 158 a proportionate amount.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a header or like mechanism having a frame, a die bed carried by the frame and having a plurality of dies in its face, means for transferring blanks between adjacent dies, comprising in combination a transfer head slidably mounted on the frame for movement along the line of the dies, a plurality of lift plates slidably mounted in said transfer head for reciprocation toward and from the dies, a pair of cooperating gripper fingers pivotally mounted on each of said lift plates, a pair of links pivoted between said transfer head and each pair of gripper fingers, means for reciprocating said transfer head, and independent means associated with each of said lift plates for independently reciprocating said lift plates and concurrently operating said gripper fingers.

2. In a header or like mechanism having a frame, a die bed carried by the frame and having a plurality of dies in its face, means for transferring blanks between adjacent dies comprising in combination a transfer head slidably mounted on the frame for movement along the line of the dies, a plurality of lift plates slidably mounted in said transfer head for reciprocation toward and from the dies, means for reciprocating said transfer head, independent means associated with each of said lift plates for independently reciprocating said lift plates, a pair of cooperating fingers pivotally mounted to each of said lift plates, and means cooperating with each of said pairs of fingers and pivoted to said transfer head, said means being so constructed and arranged that said fingers are opened and closed upon one another during reciprocal movement of the lift plate associated therewith.

3. The invention of claim 2 further defined in that each of said means for reciprocating said lift plates for controlling said fingers comprises a first link having arcuately shaped ends, one of said ends engaging a socket in said lift plate, the opposite end of the first link engaging a spool, said spool being an integral part of a spool shaft, said first link pivotally mounted about a pin at a point intermediate the ends of the link, a second link having one end engaging a separate portion of the spool shaft, said second link being pivotally mounted at a point intermediate its ends, said second link having a cam roller at its other end, and a driven cam contacted by said cam roller for pivoting said second link.

4. The invention of claim 3 further defined in that means are provided for adjusting the position of the cam that contacts the cam roller on the second link for adjusting the timed movement of the lift plate.

5. The invention of claim 3 further defined in that the pin about which said first link pivots is mounted to a structure which structure is free to pivot about an axis perpendicular to the axis of the pin thereby giving the first link two degrees of rotational freedom.

6. In a header or like machine having a frame and a plurality of dies carried by said frame, a transfer mechanism for transferring a workpiece between at least a pair of adjacent dies comprising a bracket slidably mounted on said frame, means for moving said bracket along a line substantially parallel to a line drawn between the centers of the dies, a lift plate slidably mounted to said bracket for movement toward and from the line drawn between the dies, a pair of transfer arms each pivoted at one end thereof to said lift plate, the other ends of said transfer arms adapted to receive and grip the workpiece therebetween, and a pair of links each pivoted at one end thereof to one of said transfer arms intermediate its ends, and pivoted at the other ends thereof to said bracket, whereby movement of said lift plate toward and from the line drawn between the dies closes and opens the gripping ends of the transfer arms to selectively grip and release the workpiece.

7. In a header or like machine having a frame and a plurality of dies carried by said frame, a transfer mechanism for transferring a workpiece between at least a pair of adjacent dies comprising a bracket slidably mounted on said frame, means for moving said bracket along a line substantially parallel to a line drawn between the centers of the dies, a lift plate slidably mounted to said bracket for movement toward and from the line drawn between the dies, a pair of transfer arms each pivoted at one end thereof to said lift plate, the other ends of said transfer arms adapted to receive and grip the workpiece therebetween, a pair of links each pivoted at one end thereof to one of said transfer arms intermediate its ends, an adjusting plate pivoted to said bracket, the other ends of said links being pivoted to said adjusting plate, said link pivots being eccentric of the pivot of said adjusting plate to said bracket, and means acting between said bracket and said adjusting plate to adjust the pivotal position of said adjusting plate relative to said bracket whereby the gripping portion of said transfer arms may be laterally adjusted with relation to the axial centers of the dies.

References Cited in the file of this patent

UNITED STATES PATENTS

| | | |
|---|---|---|
| 447,137 | Perry | Feb. 24, 1891 |
| 1,199,998 | Linderme | Oct. 3, 1916 |
| 1,885,288 | Pracny | Nov. 1, 1932 |
| 2,132,244 | Richard | Oct. 4, 1938 |
| 2,139,936 | Clouse | Dec. 13, 1938 |
| 2,791,786 | Hoyt et al. | May 14, 1957 |
| 2,985,897 | Byam | May 30, 1961 |